Inventor
John Constantine Grey
By Stevens, Davis, Miller & Mosher
his Attorneys

United States Patent Office 2,859,954
Patented Nov. 11, 1958

2,859,954

GAS TURBINE PLANT FOR PROVIDING A CONTINUOUS SUPPLY OF HOT COMPRESSED AIR

John Constantine Grey, Isleworth, England, assignor to Power Jets (Research & Development) Limited, London, England, a company of Great Britain Application May 26, 1952, Serial No. 290,039

Claims priority, application Great Britain June 8, 1951

14 Claims. (Cl. 263—19)

This invention relates to gas turbine plants providing a continuous supply of hot compressed air.

One main application of such plants is in the production of equipment for the blowing of a blast furnace but there are also other applications which can be foreseen, for example there are chemical processes where a continuous supply of hot compressed air is required.

According to the invention there is provided a gas turbine plant providing a continuous supply of hot compressed air comprising rotary air compressor means the output of which is divided downstream thereof into separate streams, a continuously-operable, indirect, air heater through which one air stream is passed to provide said supply, a heat source for the air heater, a combustion chamber supplied by another stream with combustion-supporting air and a gas turbine through which the combustion gases from said chamber are expanded to produce driving torque for the compressor means.

The heat source in this plant may make use of compressed air for supporting combustion in which case the air heater requires to be pressurized.

The invention also provides gas turbine plants providing a continuous supply of hot compressed air comprising rotary air compressor means the output of which is divided downstream thereof into separate streams, a continuously-operable, indirect, air heater through which one air stream is passed to provide said supply, a first combustion chamber to which another stream is fed and which produces hot gases for heating the air passing through the air heater, a second combustion chamber provided also by said other stream with combustion-supporting air and a gas turbine through which the combustion gases from said chambers are expanded to produce driving torque for the compressor means.

The output of the compressor means may be taken to a third stream also, this stream providing a flow of diluent to the combustion gases before they are expanded in the gas turbine. Alternatively there may be a direct supply of air from the compressor means to the second combustion chamber which is not then fed from the same air stream as supplies the first combustion chamber. Good part load performance can be achieved by incorporating an adjustable throttle in the third stream or in the direct supply to the second combustion chamber, as the case may be.

An air turbine may be incorporated in the plant in which the air stream, later to provide the required supply, is expanded. This is preferably situated before its entry into the air heater and it can also conveniently produce driving torque for the compressor means. Where gaseous fuel is employed, at least in the combustion chambers, that fuel may be compressed, before use, in a rotary gas compressor driven from the turbine. Where the plant is employed as an ancillary to a blast furnace that gaseous fuel can be obtained from the furnace itself and the hot compressed air supplied by the plant is used for blowing the blast furnace.

A modern blast furnace has to operate continuously for several years and may consume nearly 100 lb./sec. of pre-heated air, say at 650° C., at a pressure of about 25 lb./sq.in. gauge. It is quite common at present in a steel works to employ nearly half of the available blast furnace gas for driving the blowers and heating the air. The basic fuel for the works is coal so that even a small increase in efficiency of the blowing equipment would produce a substantial saving in the use of coal. In the more modern steel works the blowing equipment comprises centrifugal blowers driven by steam turbines and the air heating is done in large regenerative brick stoves known as Cowper stoves. The auxiliary equipment therefore often consists of: (a) three Cowper stoves, two of which are normally operating and one is a standby, each with blowing fans and changover valves; (b) two boilers, one operating and one standby; (c) one condensing steam turbo-blower; (d) one cooling tower, where there is no convenient water supply.

The progress of recent years in gas turbine technology has caused a number of engineers to turn their attention to the replacement of such blast furnace blowing equipment as has been detailed above by a suitable gas turbine plant. There have been proposals for driving the centrifugal blower by a gas turbine instead of a steam turbine, for utilizing combustion gases after some expansion in a gas turbine as the blast supply and for bleeding an axial-flow air compressor at an immediate stage to provide an air stream later used as the blast supply. Some proposals have retained the Cowper stoves although others have proposed various other forms of heaters. Most proposals have been for complicated cycles and some have introduced two-shaft layouts. To be commercially adopted it appears likely that a gas turbine plant for blowing a blast furnace must not only eliminate the Cowper stoves, it must have as good a blowing characteristic as the steam turbo-blower now employed, it should have good part load performance characteristics, it needs to be flexible in operation and as simple as possible.

The present invention also provides a gas turbine plant for blowing a blast furnace comprising rotary air compressor means, a heat exchanger through which the undivided compressor output is passed, an air turbine through which one stream of air derived from said output is expanded, a continuously-operable, pressurized, indirect, air heater to which is fed said one air stream after expansion and from which is obtained the hot compressed blast air supply for the furnace, a first combustion chamber provided with combustion-supporting air by a second air stream derived from the output of the compressor means and producing hot gases which are passed through the air heater to give up heat to said one air stream, a second combustion chamber in series with the first combustion chamber and the air heater and downstream thereof, a gas turbine through which the combustion gases from both combustion chambers are passed, a throttled flow of air also derived from the output of the compressor means which is expanded in the gas turbine and thereafter taken with said expanded combustion gases to the heat input side of the heat exchanger before being exhausted, a rotary fuel gas compressor the output from which is divided between the two combustion chambers and a common shaft on which the air and gas compressors and the air and gas turbines are mounted, the turbines driving the compressors.

The invention will now be described by way of example only with reference to certain embodiments thereof in which.

Figure 1:
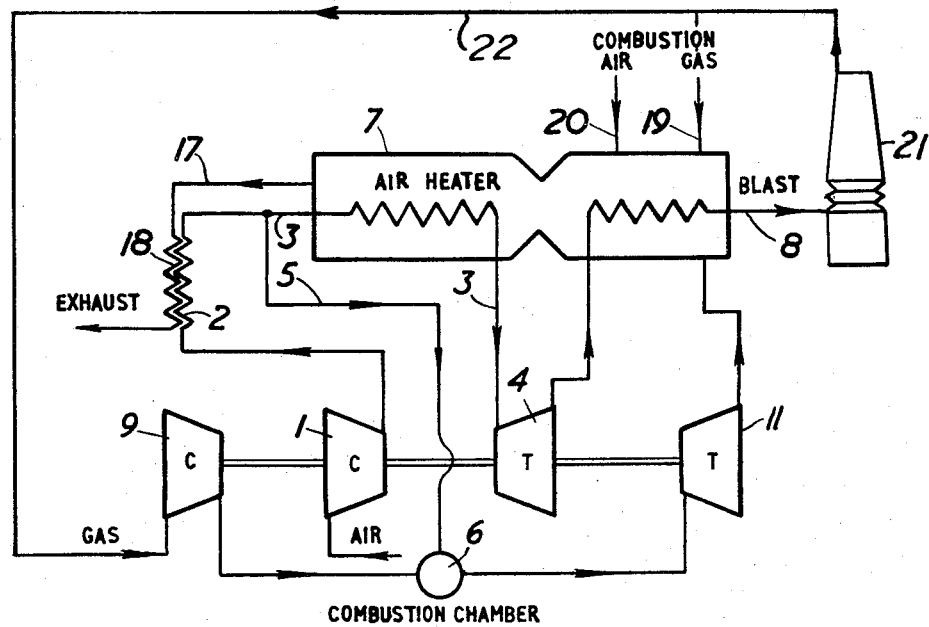
Figure 1 shows the cycle diagram of a gas turbine blast furnace blowing plant incorporating an atmospheric pressure air heater.
Figure 2:
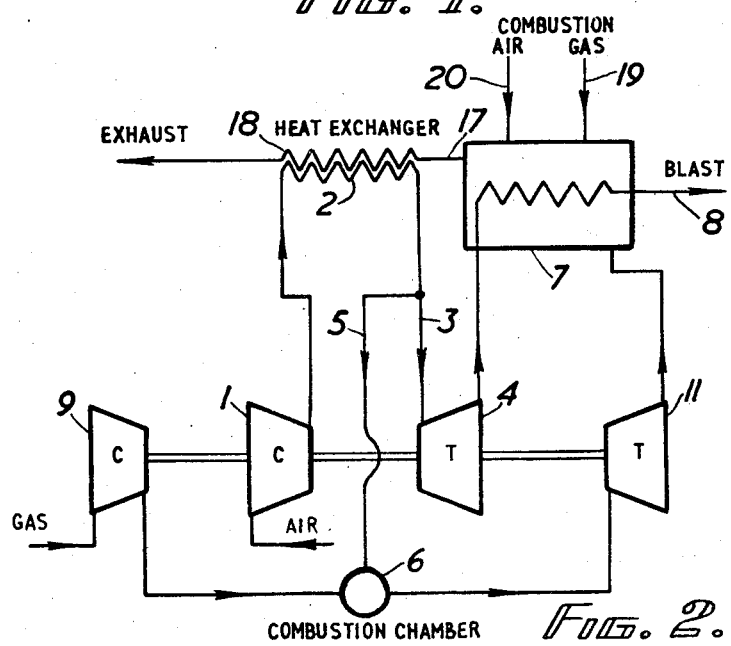
Figure 2 is a cycle diagram similar to Figure 1 in most respects but having a smaller air heater.
Figure 3:
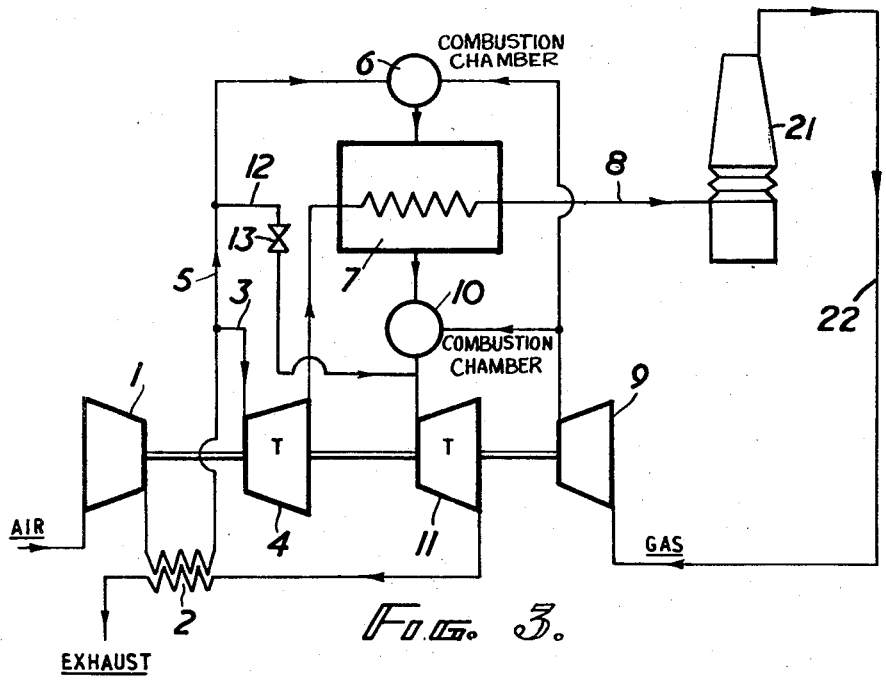

Figure 3 likewise shows a blast furnace blowing plant layout but it differs from Figures 1 and 2 in that two combustion chambers are incorporated, a pressurized air heater is employed and in that provision is made for a diluent air stream to the gas turbine of the plant.

Figure 4:
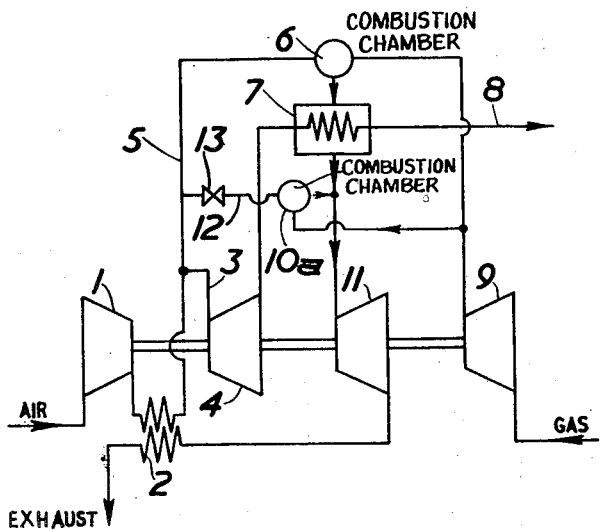

Figure 4 is generally similar to Figure 3 but the second combustion chamber has been re-positioned.

Figure 5:
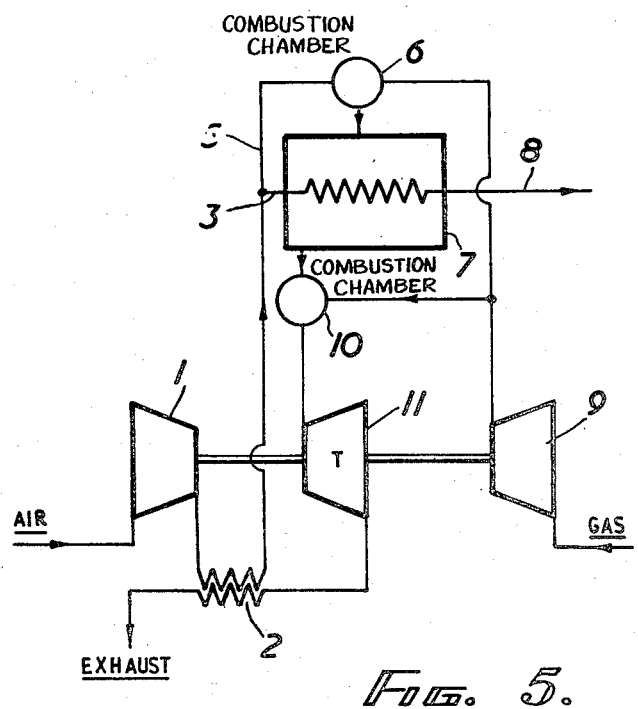

Figure 5 shows the cycle diagram of a gas turbine plant for producing a supply of hot air at a pressure of several atmospheres, which may be employed in certain industrial chemical processes. This plant does not incorporate the air turbine which has been a constituent of each of the preceding plants.

In the layout according to Figure 1 atmospheric air compressed by the rotary compressor 1 first passes through the heat reception side of a heat exchanger 2. Downstream of this it is divided into two streams one of which flows through the ducting 3 before expansion in the turbine 4. The other stream passes by way of ducting 5 to provide combustion supporting air for the combustion chamber 6. The first stream undergoes heating in the tubing of an air heater 7 of the indirect combustion type. This is preferably a heater comprising a nest of tubes contained within a casing the air to be heated passing through the tubes and acquiring heat by the combustion of fuel in the casing but externally of the tubes. Such air heaters are used for example in closed cycle gas turbine plants. The heated air by expansion in the turbine 4 provides driving torque for the compressor 1. The air exhausted from the turbine undergoes reheat in the tubing of the air heater to the temperature required for the blast, which is supplied to the furnace by the ducting 8.

Returning to the second air stream derived from the division of the compressor delivery, this air is used to support the direct combustion of fuel in combustion chamber 6 and the hot gases so generated are fed to a gas turbine 11 on the same shaft as the air compressor/air turbine set 1, 4. The exhaust from the gas turbine 11 is taken by ducting to the casing of the air heater 7 where it contributes a heat supply. It may possibly still be fit to support combustion.

The plant consumes blast furnace gas from the furnace 21 which is supplied by duct 22 to the rotary gas compressor 9, compressed and taken to the combustion chamber 6 for burning therein. A separate supply of blast furnace gas is taken to the air heater casing at 19, fresh air to support such combustion of the gas being supplied at 20. The waste combustion products from the air heater are removed by ducting 17 and are used in the heat input side 18 of the heat exchanger 2 to preheat the total air delivery from the compressor 1.

The size of the air heater may be considerably reduced by elimination of that part of it giving heat to the blast stream before expansion in the turbine 4. In Figure 2 the cycle layout is shown modified in this way. The air compressor output, before its division into separate streams, is passed via the heat reception side of the heat exchanger 2; thereafter it is immediately divided to flow through two sets of ducting 3 and 5 respectively. One part of the air heater is no longer required but, even so, an air heater operated at atmospheric pressure is bound to be bulky and therefore expensive to design and to erect. This disadvantage is overcome by the modified plant layouts shown in Figures 3 to 5.

In Figure 3 it will be seen that the main features of the plant layouts described above have been retained but the combustion gases from the combustion chamber 6 now serve as the source of heat for the air heater 7. These gases are at an elevated pressure and temperature so that the air heater has to be pressurized. It can therefore be much smaller than those previously mentioned. An additional combustion chamber 10 is also fitted downstream of, and in series with, the combustion chamber 6 and the air heater 7.

An excess of air over that required for combustion is supplied to the chamber 6 so that further gaseous fuel introduced into the chamber 10 is burnt there. The hot gases from this chamber as well as from chamber 6 are expanded through the turbine 11 and the exhaust from this turbine passes through the heat exchanger 2.

In order to improve the part load performance of the plant a by-pass duct 12 is introduced. This takes another stream from the air compressor output and delivers it just downstream of the combustion chamber 10 to the ducting leading combustion gases to the gas turbine 11. The latter arrangement is shown. The by-pass stream is throttled by the valve 13 so that the flow of diluent air via this connection may be adjusted at will.

In Figure 4 the arrangement of the previous layout is slightly altered so that the second combustion chamber, here designated 10a, is removed from the direct path of gases flowing from the combustion chamber 6, through the air heater 7 to the turbine 11. Instead it is re-positioned so that it has its own supply of clean combustion-supporting air, fed to it via the by-pass duct 12. The products of combustion and any excess air are taken to the inlet of the gas turbine 11 as before.

A plant according to either the Figure 3 or Figure 4 layout is operated with the connection 12 opened wide and with the combustion chamber 10 or 10a inoperative when the plant is operating at part load but when also the temperature of the blast air supply is required to be kept at a high value, say 650° C. If diluent air is not supplied in this way to the gases entering the turbine 11 the gases emanating from the combustion chamber 6 are at a higher temperature than those required by the turbine 11. The diluent air reduces the temperature of the gases supplied to the turbine 11 to an extent readily controllable by the valve 13. On full load both combustion chambers 6 and 10 or 10a are employed simultaneously.

In either case an additional flexibility is obtained because the temperature of the chamber 10 or 10a is made independent of the chamber 6. Moreover, at part load there is an unbalance between the mass flows of gas and air in the air heater 7 which can be counteracted by the controlled air flow through the connection 12. An additional advantage achieved at part load is that as air is diverted from the air heater the compressor loss on the gas side of the heater is reduced so that the thermal efficiency of the plant can be maintained at a higher value than would otherwise be the case.

By the provision of the two turbines 4 and 11 an important advantage is obtained in that the operating pressure of the gas turbine 11 is practically independent of the pressure required for the compressed air in the duct 8. Hence, it is possible to operate the plant at a low blast pressure in this duct 8, and the gas turbine 11 can also be operated at an optimum pressure ratio.

Compared with previously suggested plant both of the embodiments described with reference to Figures 3 and 4 have considerable advantages. For instance, only the required air supply has to be passed through the heater and in both cases the heater is pressurized. These factors considerably reduce the size of the air heater compared with what would otherwise have been the case. By having an air heater at a pressure greater than atmospheric pressure the need for any auxiliary combustion fans for introduction of the combustion mixture is obviated. In both of the embodiments the gas turbine is driven directly by combustion gases and its flow is passed directly via the heat exchanger to exhaust. Its cycle position is therefore distinct from any connection with the air heater so that the maximum temperature that may be employed is not dependent in any way upon the structure of the air heater. The useful mass flow delivered through the duct 8 will be approximately equal to the exhaust mass flow so that a higher thermal efficiency than has previously been obtainable is achieved.

It is expected that the plant diagrammatically shown in Figure 5 will find considerable application in certain chemical processes where a high temperature compressed air supply is required over a fairly small pressure range, say 4 to 5 atmospheres. This plant comprises an air compressor and a gas compressor together with a turbine all on the same shaft. These have been given the same references as the corresponding apparatus in other figures.

It will be seen that the cycle is identical except for the deletion of the air turbine 4. By deletion of this turbine the pressures on either side of the air heater tubes are approximately equalled. Because of this, much cheaper materials may be used for the air heater tubes for there is considerable stress reduction. It is envisaged that with the usual temperatures now employed in this kind of plant it should be possible to employ ordinary stainless steel tubes in the air heater of the Figure 5 equipment.

It will be appreciated that the heat input through a combustion chamber is commonly varied in gas turbine plant by controlling the fuel supply. Such control is effected in the plant described above.

What I claim is:

1. A gas turbine plant providing a continuous supply of hot compressed air comprising rotary air compressor means, air turbine means, a continuously operable indirect air heater, first duct means interconnecting in series said compressor means, said air turbine means and said air heater, a delivery duct connected to said air heater for delivering said supply of hot compressed air, a first combustion chamber constituting a heat source for the air heater, a second combustion chamber, gas turbine means through which combustion gases from the said second combustion chamber are expanded, second duct means connected to said first duct means upstream of said air turbine means and to said first combustion chamber, said air heater, said second combustion chamber and said gas turbine means in series, and shaft means drivingly connecting said gas turbine means and said air compressor means.

2. A gas turbine plant providing a continuous supply of hot compressed air comprising rotary air compressor means, air turbine means, a continuously operable indirect air heater, first duct means interconnecting in series said compressor means, said air turbine means and said air heater, a delivery duct connected to said air heater for delivering said supply of hot compressed air, a first combustion chamber constituting a heat source for the air heater, a second combustion chamber, gas turbine means through which combustion gases from the said second combustion chamber are expanded, second duct means connected to said first duct means upstream of said air turbine means and to said first combustion chamber, said air heater, said second combustion chamber and said gas turbine means in series, third duct means interconnecting said second duct means upstream of said first combustion chamber and said second duct means between said second combustion chamber and said gas turbine means, an adjustable throttle in said third duct means, and shaft means drivingly connecting said gas turbine means and said air compressor means.

3. A gas turbine plant for blowing a blast furnace comprising rotary air compressor means, a heat exchanger, and air turbine, a continuously-operable pressurized indirect air heater, first duct means interconnecting in series said compressor means, said heat exchanger said air turbine and said air heater and providing a delivery path from said air heater for a hot compressed blast air supply for the furnace, a first combustion chamber producing hot gases which are passed through the air heater to give up heat to air passing through said first duct means, a second combustion chamber, a gas turbine through which the combustion gases from both combustion chambers are passed, second duct means connected to said first duct means between said heat exchanger and said air turbine and to said first combustion chamber, said air heater, said second combustion chamber, said gas turbine and the hot path of said heat exchanger in series, third duct means interconnecting said second duct means upstream of said first combustion chamber and said second duct means between said second combustion chamber and said gas turbine, an adjustable throttle in said third duct means, a rotary fuel gas compressor the output from which is divided between the two combustion chambers, ducting connecting the said gas compressor and the two combustion chambers and a common shaft on which the air and gas compressors and the air and gas turbines are mounted.

4. A gas turbine plant providing a continuous supply of hot compressed air comprising rotary air compressor means, air turbine means, a continuously operable indirect air heater, first duct means interconnecting in series said compressor means, said air turbine means and said air heater, a delivery duct connected to said air heater for delivering said supply of hot compressed air, a first combustion chamber constituting a heat source for the air heater, gas turbine means, second duct means connected to said first duct means upstream of said air turbine means and to said first combustion chamber, said air heater and said gas turbine means in series, a second combustion chamber, third duct means connecting said second combustion chamber between said second duct means upstream of said first combustion chamber and said second duct means between the air heater and said gas turbine means, and shaft means drivingly connecting said gas turbine means and said air compressor means.

5. A gas turbine plant providing a continuous supply of hot compressed air comprising rotary air compressor means, air turbine means, a continuously operable indirect air heater, first duct means interconnecting in series said air compressor means, said air turbine means and said air heater, a delivery duct connected to said air heater for delivering said supply of hot compressed air, a first combustion chamber constituting a heat source for the air heater, a second combustion chamber, gas turbine means through which combustion gases from said second combustion chamber are expanded, second duct means connecting said first combustion chamber, said air heater and said second combustion chamber between said first duct means upstream of said air turbine means and said gas turbine means and shaft means drivingly connecting said gas turbine means and said air compressor means.

6. A gas turbine plant providing a continuous supply of hot compressed air comprising rotary air compressor means, air turbine means, a continuously operable indirect air heater, first duct means interconnecting in series said air compressor means, said air turbine means and said air heater, a delivery duct connected to said air heater for delivering said supply of hot compressed air, a first combustion chamber constituting a heat source for the air heater, gas turbine means, second duct means connected to said first duct means upstream of said air turbine means and to said first combustion chamber, said air heater and said gas turbine means in series, a second combustion chamber, third duct means connecting said compressor means, said second combustion chamber and said gas turbine means in series, and shaft means drivingly connecting said gas turbine means and said air compressor means.

7. Gas turbine plant as claimed in claim 6 in which an adjustable throttle is included in said third duct means.

8. A gas turbine plant providing a continuous supply of hot compressed air comprising rotary air compressor means, air turbine means, a continuously operable indirect air heater, first duct means interconnecting in series said air compressor means, said air turbine means and said air heater, a delivery duct connected to said air heater for delivering said supply of hot compressed air, a first combustion chamber constituting a heat source for the air heater, a second combustion chamber, gas turbine means through which combustion gases from said second combustion chamber are expanded, second duct means connected to said first duct means upstream of said air turbine means and to said first combustion chamber, said air heater, said second combustion chamber and said gas turbine means in series, third duct means connecting said compressor means and said gas turbine means, an adjustable throttle in said third duct means and shaft means drivingly connecting said gas turbine means and said air compressor means.

9. A gas turbine plant providing a continuous supply of hot compressed air comprising rotary air compressor means, air turbine means, a continuously operable indirect air heater, first duct means interconnecting in series said compressor means, said air turbine means and said air heater, a delivery duct connected to said air heater for delivering said supply of hot compressed air, a first combustion chamber constituting a heat source for the air heater, a second combustion chamber, gas turbine means through which combustion gases from the said second combustion chamber are expanded, second duct means connecting said first combustion chamber, said air heater and said second combustion chamber between said first duct means upstream of said air turbine means and said gas turbine means and shaft means drivingly connecting said gas turbine means, said air compressor means and said air turbine means.

10. A gas turbine plant providing a continuous supply of hot compressed air comprising rotary air compressor means, air turbine means, a continuously operable indirect air heater, first duct means inter-connecting in series said compressor means, said air turbine means and said air heater, a delivery duct connected to said air heater for delivering said supply of hot compressed air, a first combustion chamber constituting a heat source for the air heater, a second combustion chamber, gas turbine means through which combustion gases from said second combustion chamber are expanded, second duct means connected to said first duct means upstream of said air turbine means and to said first combustion chamber, said air heater, said second combustion chamber and said gas turbine means in series and shaft means drivingly connecting said gas turbine means, said air compressor means and said air turbine means.

11. A gas turbine plant providing a continuous supply of hot compressed air comprising rotary air compressor means, air turbine means, a continuously operable indirect air heater, first duct means interconnecting in series said air compressor means, said air turbine means and said air heater, a delivery duct connected to said air heater for delivering said supply of hot compressed air, a first combustion chamber constituting a heat source for the air heater, a second combustion chamber, gas turbine means through which combustion gases from said second combustion chamber are expanded, a second duct means connecting said first combustion chamber, said air heater and said second combustion chamber between said first duct means upstream of said air turbine means and said gas turbine means, rotary gas compressor means for compressing gaseous fuel to be employed in said first and second combustion chambers and shaft means drivingly connecting said gas turbine means, said air compressor means and said gas compressor means.

12. A gas turbine plant providing a continuous supply of hot compressed air comprising rotary air compressor means, air turbine means, a continuously operable indirect air heater, first duct means interconnecting in series said air compressor means, said air turbine means and said air heater, a delivery duct connected to said air heater for delivering said supply of hot compressed air, a first combustion chamber constituting a heat source for the air heater, a second combustion chamber, gas turbine means through which combustion gases from said second combustion chamber are expanded, second duct means connected to said first duct means upstream of said air turbine means and to said first combustion chamber, said air heater, said second combustion chamber and said gas turbine means in series, rotary gas compressor means for compressing gaseous fuel to be employed in said first and second combustion chambers and shaft means drivingly connecting said gas turbine means, said air compressor means and said gas compressor means.

13. A blast furnace blowing apparatus incorporating gas turbine plant comprising rotary air compressor means, air turbine means, a continuously operable indirect air heater, first duct means interconnecting in series said air compressor means, said air turbine means and said air heater, a delivery duct connected to said air heater for delivering a supply of hot compressed air to a blast furnace, a first combustion chamber constituting a heat source for the air heater, a second combustion chamber, gas turbine means through which combustion gases from said second combustion chamber are expanded, second duct means connecting said first combustion chamber, said air heater and said second combustion chamber between said first duct means upstream of said air turbine means and said gas turbine means, rotary gas compressor means for compressing gaseous fuel to be employed in said first and second combustion chambers, further duct means connected to said gas compressor means to convey gaseous fuel thereto from said blast furnace and shaft means drivingly connecting said gas turbine means, said air compressor means and said gas compressor means.

14. A blast furnace blowing apparatus incorporating gas turbine plant comprising rotary air compressor means, air turbine means, a continuously operable indirect air heater, first duct means connecting in series said air compressor means, said air turbine means and said air heater, a delivery duct connected to said air heater for delivering a supply of hot compressed air to the blast furnace, a first combustion chamber constituting a heat source for the air heater, a second combustion chamber, gas turbine means through which combustion gases from said second combustion chamber are expanded, second duct means connected to said first duct means upstream of said air turbine means and to said first combustion chamber, said air heater, said second combustion chamber and said gas turbine means in series, rotary gas compressor means for compressing gaseous fuel to be employed in said first and second combustion chambers, further duct means connected to said gas compressor means to convey gaseous fuel thereto from said blast furnace and shaft means drivingly connecting said gas turbine means, said air compressor means and said gas compressor means.

References Cited in the file of this patent

UNITED STATES PATENTS

| | | |
|---|---|---|
| 2,163,762 | Noack | June 27, 1939 |
| 2,223,572 | Noack | Dec. 3, 1940 |
| 2,282,740 | Noack | May 12, 1942 |
| 2,305,785 | Jendrassik | Dec. 22, 1942 |
| 2,315,336 | Karrer | Mar. 30, 1943 |
| 2,489,939 | Traupel | Nov. 29, 1949 |
| 2,632,297 | Ogston | Mar. 24, 1953 |

FOREIGN PATENTS

| | | |
|---|---|---|
| 247,527 | Switzerland | Dec. 1, 1947 |